United States Patent
Zeng et al.

(10) Patent No.: US 7,035,473 B1
(45) Date of Patent: Apr. 25, 2006

(54) DISTORTION-ADAPTIVE VISUAL FREQUENCY WEIGHTING

(75) Inventors: Wenjun Zeng, Vancouver, WA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 994 days.

(21) Appl. No.: 09/687,727

(22) Filed: Dec. 8, 2000

Related U.S. Application Data

(60) Provisional application No. 60/186,101, filed on Mar. 1, 2000.

(51) Int. Cl.
*G06K 9/36* (2006.01)

(52) U.S. Cl. ........................ 382/251; 382/239

(58) Field of Classification Search ........ 382/232–253; 375/240.02–240.03, 240.11–240.2, 240.22; 358/426.01–426.02
See application file for complete search history.

(56) References Cited

U.S. PATENT DOCUMENTS

| | | | |
|---|---|---|---|
| 4,256,368 A | 3/1981 | Task | |
| 4,365,873 A | 12/1982 | Ginsburg | |
| 4,493,539 A | 1/1985 | Cannon, Jr. | |
| 4,511,228 A | 4/1985 | von Gierke et al. | |
| 5,410,351 A * | 4/1995 | Kojima ................... | 375/240.12 |
| 5,500,672 A | 3/1996 | Fujii | |
| 5,680,483 A | 10/1997 | Tranchard | |
| 5,754,793 A * | 5/1998 | Eom et al. .................. | 709/247 |
| 5,867,602 A * | 2/1999 | Zandi et al. ................ | 382/248 |
| 5,883,979 A | 3/1999 | Beretta et al. | |
| 6,337,881 B1 * | 1/2002 | Chaddha ................ | 375/240.16 |
| 6,397,392 B1 * | 6/2002 | Wooley et al. .................. | 2/102 |
| 6,650,782 B1 * | 11/2003 | Joshi et al. .................. | 382/239 |
| 6,668,090 B1 * | 12/2003 | Joshi et al. .................. | 382/239 |
| 6,683,991 B1 * | 1/2004 | Andrew et al. ............. | 382/240 |
| 6,944,350 B1 * | 9/2005 | Budge et al. ................ | 382/240 |

FOREIGN PATENT DOCUMENTS

| | | |
|---|---|---|
| JP | 01-129589 | 5/1989 |
| JP | 104-127613 | 5/1992 |

(Continued)

OTHER PUBLICATIONS

Optical Engineering—Application of a Noise-adaptive Contrast Sensitivity Function to Image Data Compression (Aug. 1990).

(Continued)

*Primary Examiner*—Joseph Mancuso
*Assistant Examiner*—Ishrat Sherali
(74) *Attorney, Agent, or Firm*—Chernoff, Vilhauer, McClung & Stenzel

(57) ABSTRACT

The ability of the visual system to detect contrast in an image is a function of the frequency of the contrasting pattern and the distortion of the image. The visual system is more sensitive to contrasting patterns of lower frequency. When the image is significantly distorted, the visual system is even more sensitive to lower frequencies than higher frequencies. An image encoder employs lossy data compression processes producing a distorted reconstructed image. A method of quantizing image data including the step of varying the magnitude of a quantization step as a function of the distortion of an image is disclosed for further visually optimizing image quantization. Another method utilizes distortion adaptive weighting to vary the limit of code block truncation during embedded bitstream coding to visually optimize image compression by increasing relative lossiness of compression at higher frequencies.

4 Claims, 5 Drawing Sheets

FOREIGN PATENT DOCUMENTS

| | | |
|---|---|---|
| JP | 04-168880 | 6/1992 |
| JP | 05-103317 | 4/1993 |
| JP | 05-111015 | 4/1993 |
| JP | 05-227510 | 9/1993 |
| JP | 05-252050 | 9/1993 |
| JP | 07-087498 | 3/1995 |
| JP | 07-203430 | 9/1995 |
| JP | 09-065334 | 3/1997 |
| JP | 10-112860 | 4/1998 |
| JP | 2000-232628 | 8/2000 |

OTHER PUBLICATIONS

Visibility of Wavelet Quantization Noise (Aug. 1997).
Visual Progressive Coding (Jan. 1999).
Comparative Study of Wavelet and DCT Decompositions with Equivalent Quantization and Encoding Strategies for Medical Images (Mar. 1995).
Visual Masking in Wavelet Compression for JPEG2000 (Jan. 2000).
Point-wise Extended Visual Masking for JPEG-2000 Image Compression (Sep. 2000).

* cited by examiner

DISTORTION-ADAPTIVE VISUAL FREQUENCY WEIGHTING

CROSS-REFERENCE TO RELATED APPLICATIONS

This application claims the benefit of U.S. Provisional Application No. 60/186,101, filed Mar. 1, 2000.

BACKGROUND OF THE INVENTION

The present invention relates to image compression and, more particularly, a method of distortion adaptive frequency weighting for image compression.

Communication systems are used to transmit information generated by a source to some destination for consumption by an information sink. Source coding or data compression is a process of encoding the output of an information source into a format that reduces the quantity of data that must be transmitted or stored by the communication system. Data compression may be accomplished by lossless or lossy methods or a combination thereof. The objective of lossy compression is the elimination of the more redundant and irrelevant data in the information obtained from the source.

Video includes temporally redundant data in the similarities between the successive images of the video sequence and spatially redundant data in the similarities between pixels and patterns of pixels within the individual images of the sequence. Temporally redundant data may be reduced by identifying similarities between successive images and using these similarities and an earlier image to predict later images. Spatially redundant data is characterized by the similarity of pixels in flat areas or the presence of dominant frequencies in patterned areas of an image. Reduction of spatially redundant data is typically accomplished by the steps of transformation, quantization, and entropy coding of the image data. Transformation converts the original image signal into a plurality of transform coefficients which more efficiently represent the image for the subsequent quantization and entropy coding phases. Following transformation, the transform coefficients are mapped to a limited number of possible data values or quantized. The quantized data is further compressed by lossless entropy coding where shorter codes are used to describe more frequently occurring data symbols or sequences of symbols.

Quantization is a lossy process and a significant part of the overall compression of video data is the result of discarding data during quantization. The underlying basis for lossy compression is the assumption that some of the data is irrelevant and can be discarded without unduly effecting the perceived quality of the reconstructed image. In fact, due to the characteristics of the human visual system (HVS) a large portion of the data representing visual information is irrelevant to the visual system and can be discarded without exceeding the threshold of human visual perception. As the lossiness of the compression process is increased, more data are discarded reducing the data to be stored or transmitted but increasing the differences between the original image and the image after compression or the distortion of the image and the likelihood that the distortion will be visually perceptible and objectionable.

One measure of human visual perception is contrast sensitivity which expresses the limits of visibility of low contrast patterns. Contrast is the difference in intensity between two points of a visual pattern. Visual sensitivity to contrast is affected by the viewing distance, the illumination level, and, because of the limited number of photoreceptors in the eye, the spatial frequency of the contrasting pattern. Contrast sensitivity is established by increasing the amplitude of a test frequency basis function until the contrast reaches a "just noticeable difference" (JND) where humans can detect the signal under the specific viewing conditions. As illustrated in FIG. 1, a plot of the JND produces a contrast sensitivity function (CSF) 10 expressing human visual contrast sensitivity as a function of the spatial frequency of the visual stimulus for specific viewing conditions. Since human eyes are less sensitive to high frequency patterns, high frequency components of an image can be quantized more coarsely than low frequency components or discarded with less impact on human perception of the image.

Frequency weighting is a commonly used technique for visually optimizing data compression in both discrete cosine transform (DCT) and wavelet-based image compression systems to take advantage of the contrast sensitivity function (CSF). CSF frequency weighting has been used to scale the coefficients produced by transformation before application of uniform quantization. On the other hand, CSF frequency weighting may be applied to produce quantization steps of varying sizes which are applied to the different frequency bands making up the image. In a third technique, CSF frequency weighting may be used to control the order in which sub-bitstreams originating from different frequency bands are assembled into a final embedded bitstream. The CSF has been assumed to be single valued for specific viewing conditions. However, the CSF is determined under near visually lossless conditions and observation indicates that the contrast sensitivity of the human visual system is affected by image distortion which is, in turn, inversely impacted by data compression efficiency. What is desired therefore, is a method of improved visual optimization of image data source coding useful at the low data rates of systems employing high efficiency data compression.

DETAILED DESCRIPTION OF THE PREFERRED EMBODIMENT

Figure 2:
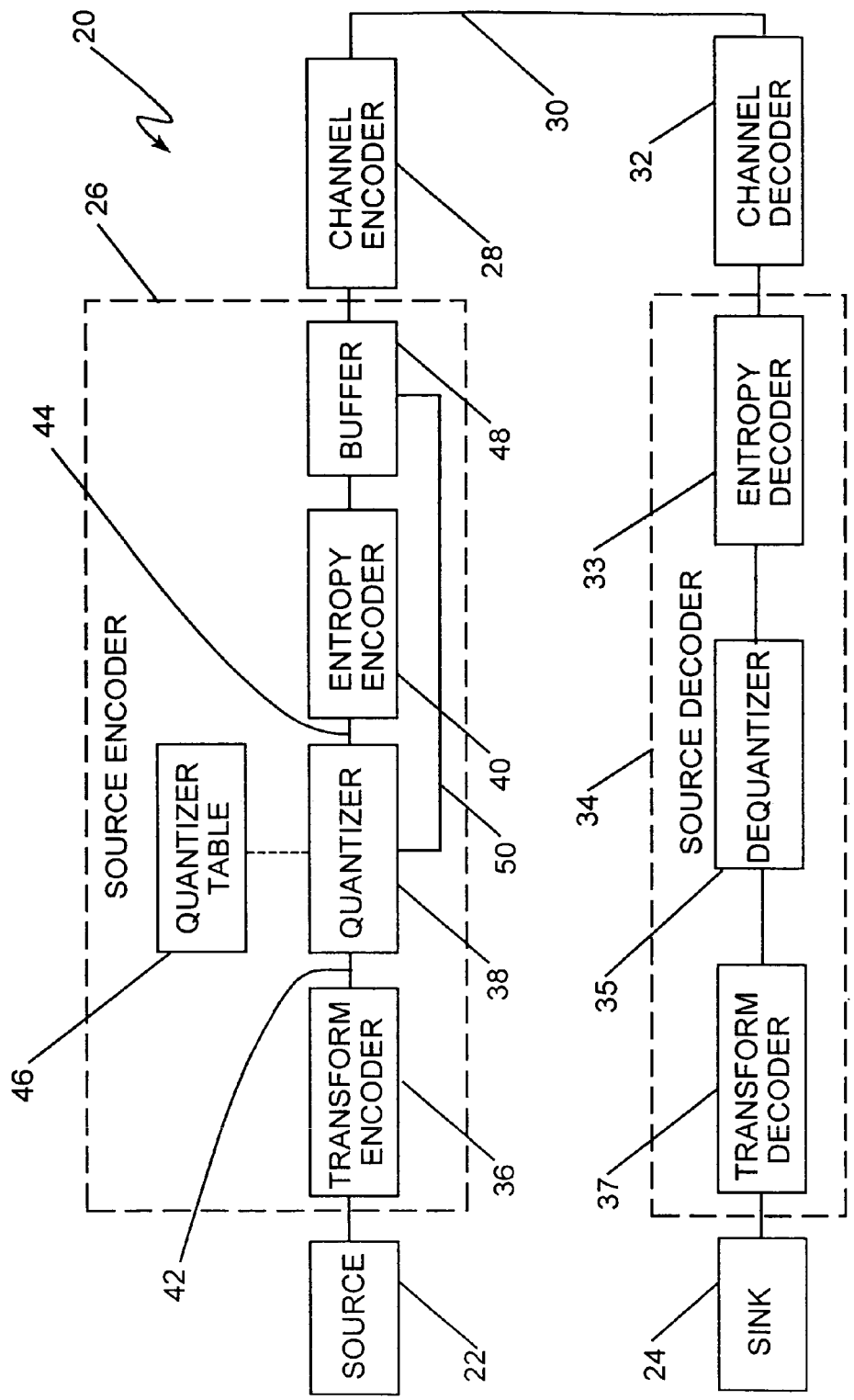
FIG. 2 is a block diagram of an image communication system.

Referring to FIG. 2, in a communication system 20 information originating at a source 22 is transmitted to a consuming destination or sink 24. To reduce the quantity of data to be transmitted or stored and the rate of data transfer required of the communication system 20, the data output by the source 22 may first be compressed by a source encoder 26. Source encoders typically apply lossless and lossy processes to reduce the quantity of data obtained from the source 22. For example, if the source 22 output is a video sequence comprising a succession of substantially identical frames, the quantity of transmitted data and the rate of data transmission can be substantially reduced by transmitting a reference frame and the differences between the reference frame and succeeding frames. The output of the source encoder 26 is input to a channel encoder 28 that adds redundancy to the data stream so that errors resulting from transmission 30 can be detected or corrected at the channel decoder 32 at the destination. The source decoder 34 reverses the source encoding processes with, for example entropy decoding 33, dequantization 35, and inverse transformation 37, to reconstruct the original information output by the source 22 for consumption by the information sink 24. If the source encoding includes a lossy compression process, some of the information output by the source 22 is discarded during source coding and output of the source decoder 34 will be an approximation of the original information. If the original information obtained from the source 22 was an image, the reconstructed image will be a distorted version of the original.

The quantity of data required to digitally describe images is so great that digital imaging and digital video would be impractical for many applications without lossy data compression. An objective of the digital video source encoder 26 is the reduction of temporally redundant information between successive images of the video sequence and spatially redundant information within the individual images of the sequence. Within the source encoder 26, the video sequence is subject to transformation 36, quantization 38, and entropy encoding 40. In the transformation module 36, the spatial domain signal describing an image is converted to a plurality of transform coefficients by the application of a reversible transform. The resulting array of transform coefficients describe the amplitudes of the constituent frequencies making up the image data. The discrete cosine transform (DCT) and wavelet transforms are commonly used for coding the spatial data of individual images, referred to as intra-frame coding or intra-coding. The differences between successive images are also isolated in the source encoder 26 and transformation is applied to the data representing those differences or residual data. Transformation is a lossless process. Likewise, entropy encoding 40 in the source encoder 26 is a lossless process. Entropy coding typically involves run length, variable length, arithmetic encoding to compress the quantized data. While entropy encoding reduces the quantity of data, the compression is insufficient for most image and video applications.

Figure 3:
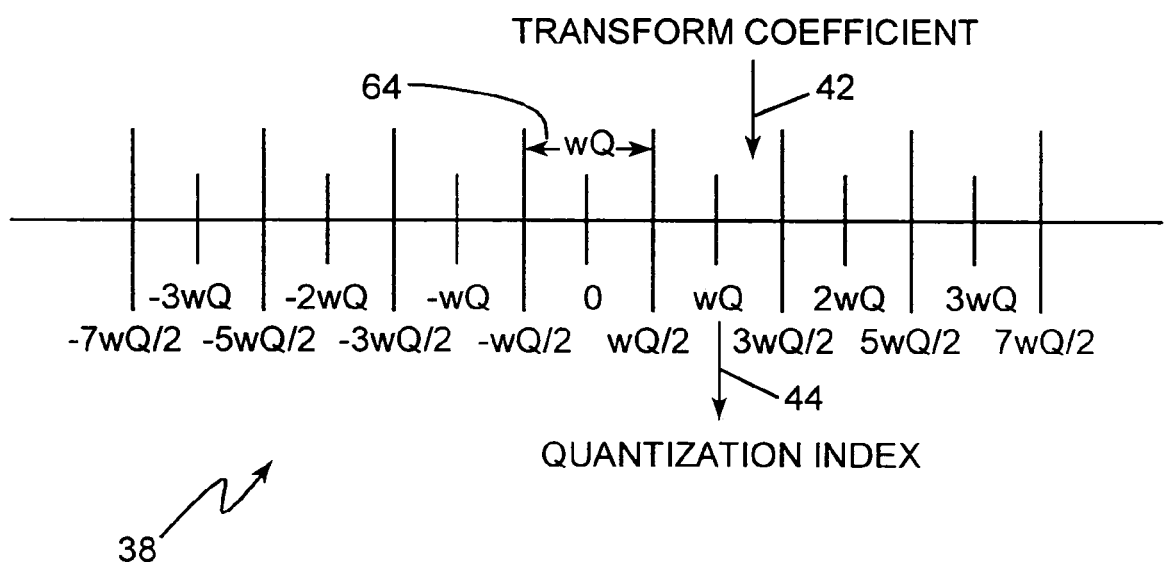
FIG. 3 is a graphic illustration of the quantizer steps of an image quantizer and quantization of an exemplary transform coefficient.

Most of the data compression is the result of discarding image data during quantization or the mapping of the transformed image data to a limited number of possible data values in a quantizer 38. Transform coefficients 42 produced by transformation 36 are input to the quantizer 38 and quantization indices 44 are output and sent to the entropy encoder 40. Referring to FIG. 3, an exemplary transform coefficient 60 is input to an exemplary quantizer 38 having a uniform quantizer step size 64 (wQ) where w is a weighting factor that may be used to adjust the magnitude of the quantizer step. For example, the quantizer step size may be adjusted as a function of the frequency of the image signal component represented by the input transform coefficient 60 to take advantage of the contrast sensitivity function (CSF). Weighting factors can be stored in a quantization table 46. In addition to the midpoint uniform threshold quantizer illustrated in FIG. 3, quantizers incorporating, by way of example, non-uniform step sizes, a dead zone, and an output index at the centroid of the step are also used for video encoding.

In the quantizer 38, the value of the transform coefficient 60 is compared to the values within the limits or bounds of the various quantizer steps and, in the case of the midpoint uniform threshold quantizer, the value of the midpoint of the quantizer step range having bounds bracketing the input transform coefficient 60 is output as the corresponding quantizer index 62. Quantization is a lossy process in which data that more precisely describes a transform coefficient is discarded to produce the corresponding quantization index 44. The quantity of data discarded during quantization depends upon the number of levels and, therefore, the step sizes 64 available in the quantizer 38 to describe inputs between the minimum and maximum transform coefficients. As the magnitude of the steps 64 (wQ) increase, more data are discarded, increasing the compression efficiency and reducing the data rate, but making the reconstructed image an increasingly rougher approximation or more distorted copy of the original.

An additional function of the quantizer 38 is rate control for the encoder. Most communication systems require a relatively constant data rate. On the other hand, video source encoding has an inherently variable data rate because of the differences in quantities of data encoded for inter-coded and intra-coded images. To control the data rate and avoid failing the system, the output of the quantizer 38 may stored temporarily in a buffer 48. The quantity of data in the buffer 48 is fed back 50 to the quantizer 38. As the buffer 48 fills and empties, the magnitudes of the quantization steps are increased or decreased, respectively, causing more or less data, respectively, to be discarded. As a result, the data rate at the output of the quantizer 38 is varied so the buffer 48 does not overflow or underflow causing a loss of data.

Figure 6:
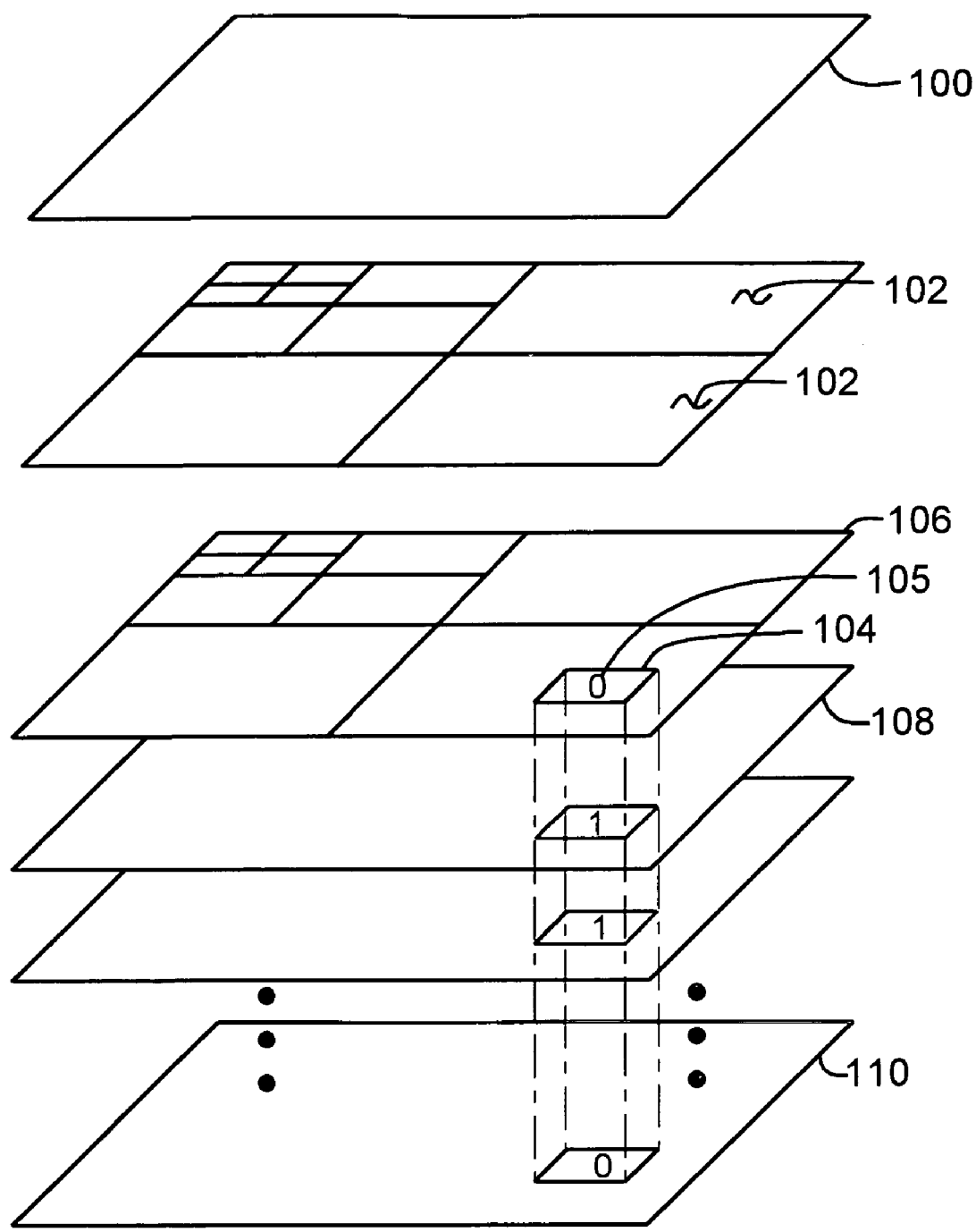
FIG. 6 is a schematic diagram of wavelet compression and the assembly of an embedded bitstream.

For wavelet based compression, data reduction may also be accomplished by controlling the order in which sub-bitstreams originating in the various frequency sub-bands are assembled into the final embedded bitstream. Referring to FIG. 6, in a wavelet compression process an image 100 is decomposed by filtering and subsampling into a plurality of frequency sub-bands 102 for each of a plurality of resolution levels. Following transformation, the resulting wavelet coefficients are quantized or mapped to quantizer indices representing a range of coefficients included within a plurality of quantizer steps. Differing types of quantizers may be used, for example, the JPEG 2000 standard specifies a uniform scalar quantizer with a fixed dead band about the origin. Quantization with this quantizer is accomplished by dividing each wavelet coefficient by the magnitude of the quantization step and rounding down. The result is a multiple digit quantization index for each code block 104, a fundamental spatial division of the sub-band for entropy coding purposes. Each sub-band may be considered to be a sequence of binary arrays comprising one digit or bit 105 from each quantization index known as bitplanes. The first bitplane 106 comprises the array of the most significant bit (MSB) of all the quantization indices for the code blocks of the sub-band. The second bitplane 108 comprises the array of the next most significant bit and so forth with the final bitplane 110 comprising the least significant bits (LSB) of the indices. The bit stream is encoded by scanning the values of the bits making up the successive bitplanes. As each bitplane is scanned, more information (the next most significant digit of each code block) is coded for the code block. On the other hand, the encoder may stop coding at any time, discarding the information represented by the less significant bitplanes that were not encoded. Quality layers can be encoded in the embedded bitstream by altering the limits of the truncation to be applied to the data of the various bitplanes.

Discarding data increases the compression efficiency but distorts the image as the difference or error between original and reconstructed pixels increase. On the other hand, limitations of the human visual system (HVS) make it possible to discard some data with little or no effect on the perceived quality of the image. Further, the characteristics of the HVS makes the impact on perceived quality resulting from discarding certain image data more important than the impact produced by discarding other image data.

Figure 1:
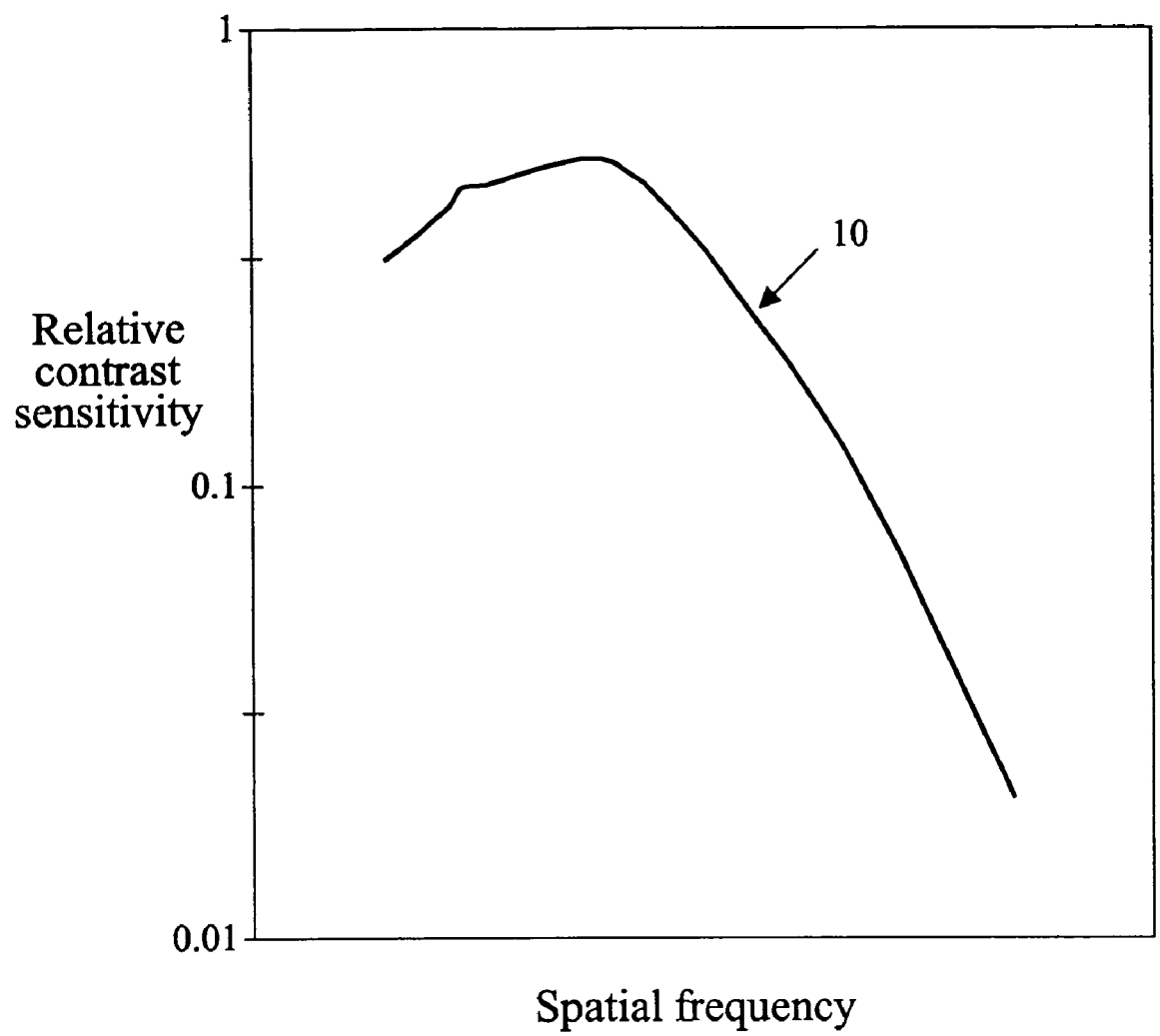
FIG. 1 is an exemplary graph of the contrast sensitivity function (CSF).

Visual optimization of the source encoding process exploits the perceptual characteristics of the vision system to balance perceived image quality against data rate reduction resulting from compression. FIG. 1 illustrates the contrast sensitivity function expressing a relationship between contrast sensitivity and spatial frequency. Contrast sensitivity measures the limits of visibility for low contrast patterns and is a function of the viewing distance, the illumination level, and spatial frequency of the contrasting pattern. The contrast sensitivity function is established by increasing the amplitude of sinusoidal basis functions of differing frequencies until the contrast between the maximum and minimum of the amplitude of each basis function reaches a just noticeable difference (JND) threshold of human visibility when viewed under specific conditions. Since human eyes are less sensitive to high frequency signals, high frequency components of an image can be more coarsely quantized or discarded with little impact on human perception of the image.

One technique for exploiting the contrast sensitivity of the human visual system is frequency weighting of the step size of the quantizer 38. The quanitzer step size is weighted by altering the weighting factor (w) for the appropriate quantizer step 64. The quantization step size may be weighted for the effect of the contrast sensitivity function (CSF) by altering the weighting (w), (where $w=1/w_i$) of the quantiztion step 64 and $w_i$ equals:

$$w_i k/T_i$$

where:
  $w_i$=the CSF weighting factor
  $T_i$=the contrast detection threshold for the ith frequency
  k=a constant normalization factor.

Contrast sensitivity weighting can also be accomplished by weighting the transform coefficients 42 input to the quantizer. Likewise, frequency weighting may be accomplished by using a weighting factor to vary the number of bits encoded for the code blocks of the sub-bands representing the various frequency components of the image.

However, observation of the output of video systems led the current inventor to the conclusion that in addition to spatial frequency, viewing distance, and illumination, the contrast sensitivity of the human visual system is also sensitive to the distortion of the image. Under a condition of significant distortion associated with low system bit rates, the human visual system is relatively less sensitive to high frequency errors and more sensitive to errors in lower frequency image components than it is under the near visually lossless conditions under which the contrast sensitivity function is established. Therefore, as the data rate decreases and distortion increases, increasing the lossiness of compression at higher frequencies relative to the lossiness at lower frequencies improve the perceived image quality.

Figure 4:
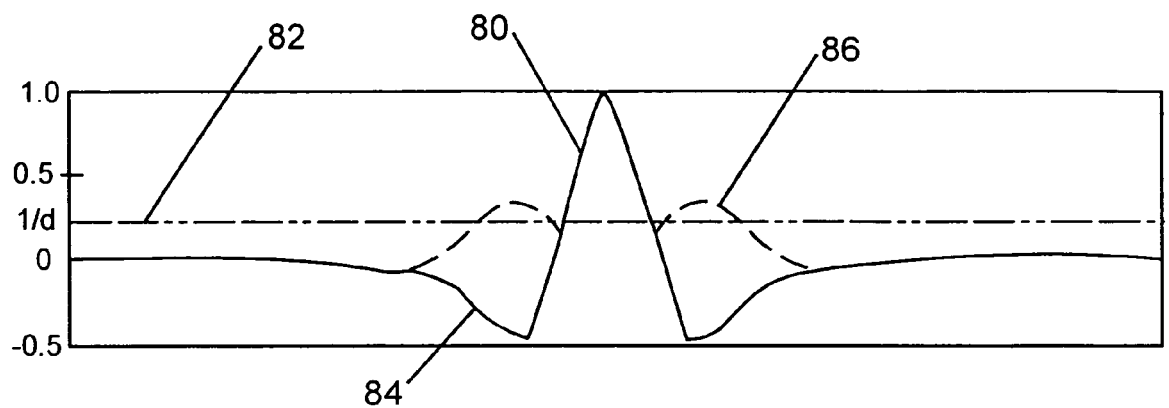
FIG. 4 is a graphic illustration of a basis function for a wavelet transform.

The CSF is established under near visually lossless conditions where the distortion signal is small with a magnitude on the order of the detection threshold for all frequencies. However, for low system data rates the distortion signal is typically large as a result of discarding significant portions of the image data in the quantizer 38. As a result, as the system data rate decreases the distortion signal becomes increasingly visible. FIG. 4 illustrates an exemplary effective basis distortion function 80 for a wavelet-based compression process. The effective basis distortion function 80 is the product of a basis function $f_i(x)$ with unit peak-to-mean amplitude for the ith sub-band and a distortion ($d_i$) normalized with respect to the detection threshold ($T_i$) for the basis function at the ith sub-band frequency. The effective basis distortion function is defined as:

$$g(x; d) = d_i f_i(x), \text{ if } |d_i f_i(x)| > 1$$
$$= 0, \text{ otherwise}$$

Portions of the effective basis distortion function 80 exceeding the normalized visibility detection threshold (1/d) 82 are visible. As the distortion increases, side lobes 84 of the original basis function become visible as the absolute value of the product of the distortion and basis function 86 exceeds the level of detection 82. The side lobes 84 become increasingly visible as the frequency of the basis function decreases.

To compensate for the increased visibility of the side lobes 84 of the basis function at low frequencies and low bit rates, the contrast sensitivity function weighting is adjusted as follows:

$$w_i' = w_i \lambda_i$$

where:
  $w_i'$=adjusted contrast sensitivity weighting
  $w_i$=contrast sensitivity function weighting
  $\lambda$=low bit rate compensation factor
  i=ith frequency sub-band and where:

$$\lambda_i(d_i) = \left( \int_{-\infty}^{+\infty} |g_i(x; d_i)|^p \, dx \right)^{1/p}, 0 \le p \le \infty, \text{ when } d_i > 1$$
$$\lambda(d_i) = 1, \text{ when } d_i < 1$$

Figure 5:
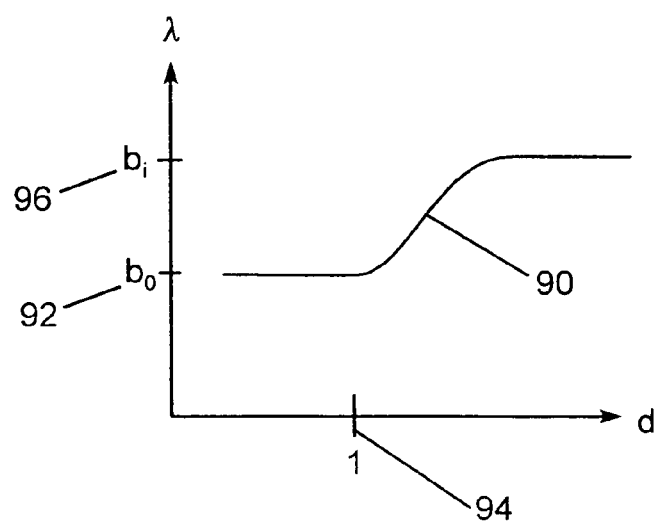
FIG. 5 is a graph of a distortion weighting function.

As illustrated in FIG. 5, if the distortion, the peak-to-mean amplitude of the distortion of each basis function, is less than the frequency detection threshold ($T_i$) (that is, $d_i$, is less than 1) no compensation 90 is made for the potential perceptibility of the side lobes of the basis functions. On the other hand, if the peak-to-mean amplitude of the basis function is greater than the threshold ($T_i$), then the portion of the basis function having an amplitude greater than the threshold $T_i$ will contribute to visual distortion and compensation is applied. As a result, compensation is common constant 90 for all frequencies below the distortion threshold 94 ($d_i \le 1$). For distortion above the threshold 94 compensation is applied with compensation converging at a maximum value 96 ($b_i$).

The distortion adaptive visual frequency weighting adjusts the frequency weighting for the contrast sensitivity function on the basis of the instant normalized peak-to-mean amplitude of the distortion signal. Distortion adaptive visual frequency weighting can be applied to vary the relative sizes of the quantizer steps to be applied to transform coefficients representing higher and lower frequency components of the image. The range of transform coefficients between upper and lower limits defining the quantizer step is decreased for lower frequencies, relative to the range of transform coefficients included in a quantizer step to which higher frequencies are mapped, as the distortion of the image increases. In the alternative, the relative sizes of quantizer steps can be varied if the distortion increases beyond a threshold distortion. Since the distortion increases as the data rate decreases, distortion adaptive frequency weighting can be responsive to data rate or to changes in data rate beyond a threshold rate of change. Likewise, the value of the transform coefficient before quantization can be adjusted in response to distortion. In a third technique, distortion adaptive visual frequency weighting can be applied during the embedded coding process to, for example, control the bitstream ordering for quality layers or to establish a maximum amount of adjustment or a most aggressive weighting to apply in very low bit rate encoding. Distortion adaptive visual frequency weighting can also be applied to non-embedded coding at very low bit rates. Weighting tables incorporating the compensation factor can be established to produce a target visually normalized distortion.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A method of compressing an image comprising the steps of:
   (a) separating data representing said image into a plurality of image data frequency sub-bands;
   (b) transforming said data to a plurality of transform coefficients;
   (c) mapping said transform coefficients to a plurality of quantizer indices, each said quantizer index comprising a plurality of digits arrayed from a most significant digit to a least significant digit;
   (d) adding said most significant digits of said quantizer indices representing an image data frequency sub-band to a bitstream;
   (e) repeating step (d) for a less significant digit of said quantizer indices until a number of significant digits specified by a truncation limit for said image data frequency sub-band is reached; and
   (f) varying said truncation limit for at least two of said image data frequency sub-bands as a function of a distortion of said image, wherein the magnitude of the quantization is increased for higher frequencies relative to lower frequencies as the data rate of transmission of said image data decreases, wherein the magnitude of the quantization is decreased for higher frequencies relative to lower frequencies as the data rate of transmission of said image data increases.

2. The method of claim 1 further comprising the step of varying said truncation limit as a function of a frequency of said image data represented by said image data frequency sub-band.

3. The method of claim 1 wherein the step of varying said truncation limit for at least two of said image data frequency sub-bands as a function of a distortion of said image comprises varying said truncation limit to increase a number of significant digits added to said bit stream for a lower frequency image sub-band relative to a number of significant digits added to said bit stream for a higher frequency sub-band as said distortion of said image increases.

4. The method of claim 3 further comprising the step of varying said truncation limit as a function of a frequency of said image data represented by said image data frequency sub-band.

* * * * *

UNITED STATES PATENT AND TRADEMARK OFFICE
CERTIFICATE OF CORRECTION

PATENT NO. : 7,035,473 B1
APPLICATION NO. : 09/687727
DATED : April 25, 2006
INVENTOR(S) : Zeng et al.

It is certified that error appears in the above-identified patent and that said Letters Patent is hereby corrected as shown below:

Column 4, line 21 - change "quantizer 38 may stored" to --quantizer 38 may be stored--

Column 5, line 34 - change "$w_i k/T_i$" to --$w_i = k/T_i$--

Signed and Sealed this

First Day of April, 2008

JON W. DUDAS
*Director of the United States Patent and Trademark Office*